United States Patent
Carroll, III et al.

(10) Patent No.: US 6,752,450 B2
(45) Date of Patent: Jun. 22, 2004

(54) FORMED ENERGY ABSORBER

(75) Inventors: Phillip Patrick Carroll, III, Bloomfield Hills, MI (US); Joel Matthew Cormier, Ferndale, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 0 days.

(21) Appl. No.: 10/004,739

(22) Filed: Dec. 4, 2001

(65) Prior Publication Data

US 2002/0070584 A1 Jun. 13, 2002

Related U.S. Application Data

(63) Continuation-in-part of application No. 09/884,813, filed on Jun. 19, 2001, which is a continuation-in-part of application No. 09/499,205, filed on Feb. 7, 2000, now Pat. No. 6,247,745, which is a continuation of application No. 09/328,196, filed on Jun. 8, 1999, now Pat. No. 6,199,942, which is a continuation of application No. 09/018,666, filed on Feb. 4, 1998, now Pat. No. 6,017,084.

(51) Int. Cl.[7] .............................................. B60R 21/04
(52) U.S. Cl. .................. 296/187.03; 293/133; 280/751; 188/371
(58) Field of Search ................ 296/187.03, 187.04, 296/187.05, 187.09, 187.11, 187.12, 39.1; 293/100, 132, 133, 109, 110; 280/748, 751; 206/521.4, 521.9, 521.8; 188/377, 371

(56) References Cited

U.S. PATENT DOCUMENTS

| | | |
|---|---|---|
| 2,346,161 A | 4/1944 | Grant |
| 3,088,539 A | 5/1963 | Mathues et al. |
| 3,231,454 A | 1/1966 | Williams |
| 3,684,235 A | 8/1972 | Schupbach |
| 3,926,463 A | 12/1975 | Landwehr et al. |
| 3,933,387 A | 1/1976 | Salloum et al. |
| 4,022,505 A | 5/1977 | Saczawa, Jr. |
| 4,631,221 A | 12/1986 | Disselbeck et al. |
| 5,030,501 A | 7/1991 | Colvin et al. |
| 5,382,051 A | 1/1995 | Glance |
| 5,399,406 A | 3/1995 | Matsuo et al. |
| 5,518,802 A | 5/1996 | Colvin et al. |
| 5,731,062 A | 3/1998 | Kim et al. |
| 5,972,477 A | 10/1999 | Kim et al. |
| 6,017,084 A | 1/2000 | Carroll, III et al. |
| 6,199,942 B1 | 3/2001 | Carroll, III et al. |
| 6,247,745 B1 | 6/2001 | Carroll, III et al. |

FOREIGN PATENT DOCUMENTS

| | | |
|---|---|---|
| DE | 199 47 245 A1 | 4/2000 |
| EP | 56131849 | 10/1981 |
| EP | 0 863 056 A1 | 9/1998 |
| WO | WO 00/01525 | 1/2000 |
| WO | WO 00/31434 | 6/2000 |
| WO | WO 00/31434 A1 | 6/2000 |

OTHER PUBLICATIONS

International Search Report, Application No. PCT/US 02/37005, Mar. 31, 2003.
Supplementary European Search Report, Application No. EP 00 94 1232, Mar. 17, 2003.
International Search Report, Application No. PCT/US 02/37005, Mar. 31, 2003.

Primary Examiner—Joseph D. Pape
(74) Attorney, Agent, or Firm—Brooks Kushman P.C.

(57) ABSTRACT

An energy absorber comprising a base and a plurality of recesses extending from the base. At least some of the plurality of recesses have a rim, a first wall extending between the base and the rim, a first floor, and a second wall extending between the rim and the first floor. At least some of the plurality of recesses are oriented such that their first and second walls are inclined respectively at angles alpha and beta to a major incident component of the impacting force, where alpha and beta lie between 1 and 45 degrees.

25 Claims, 4 Drawing Sheets

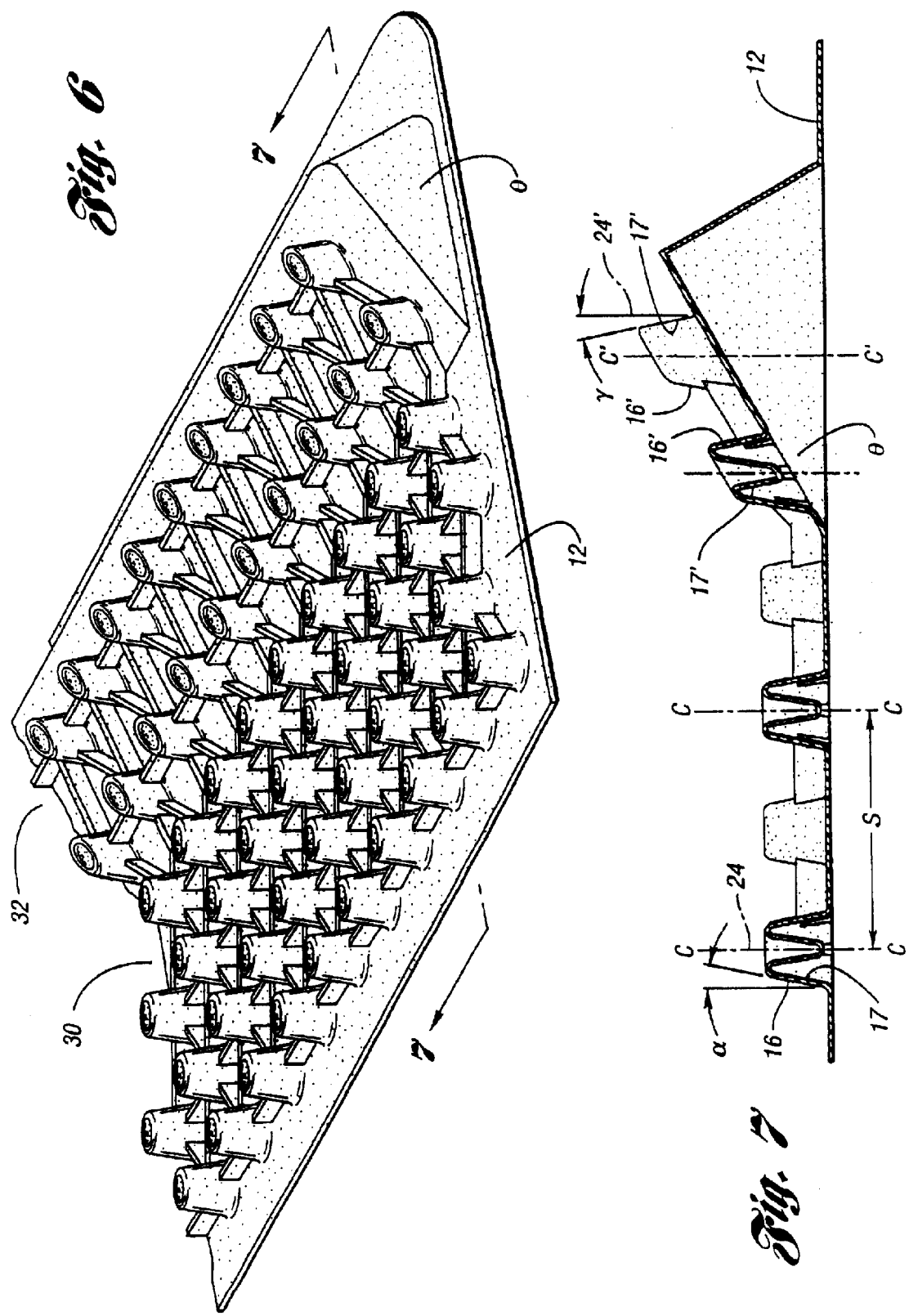

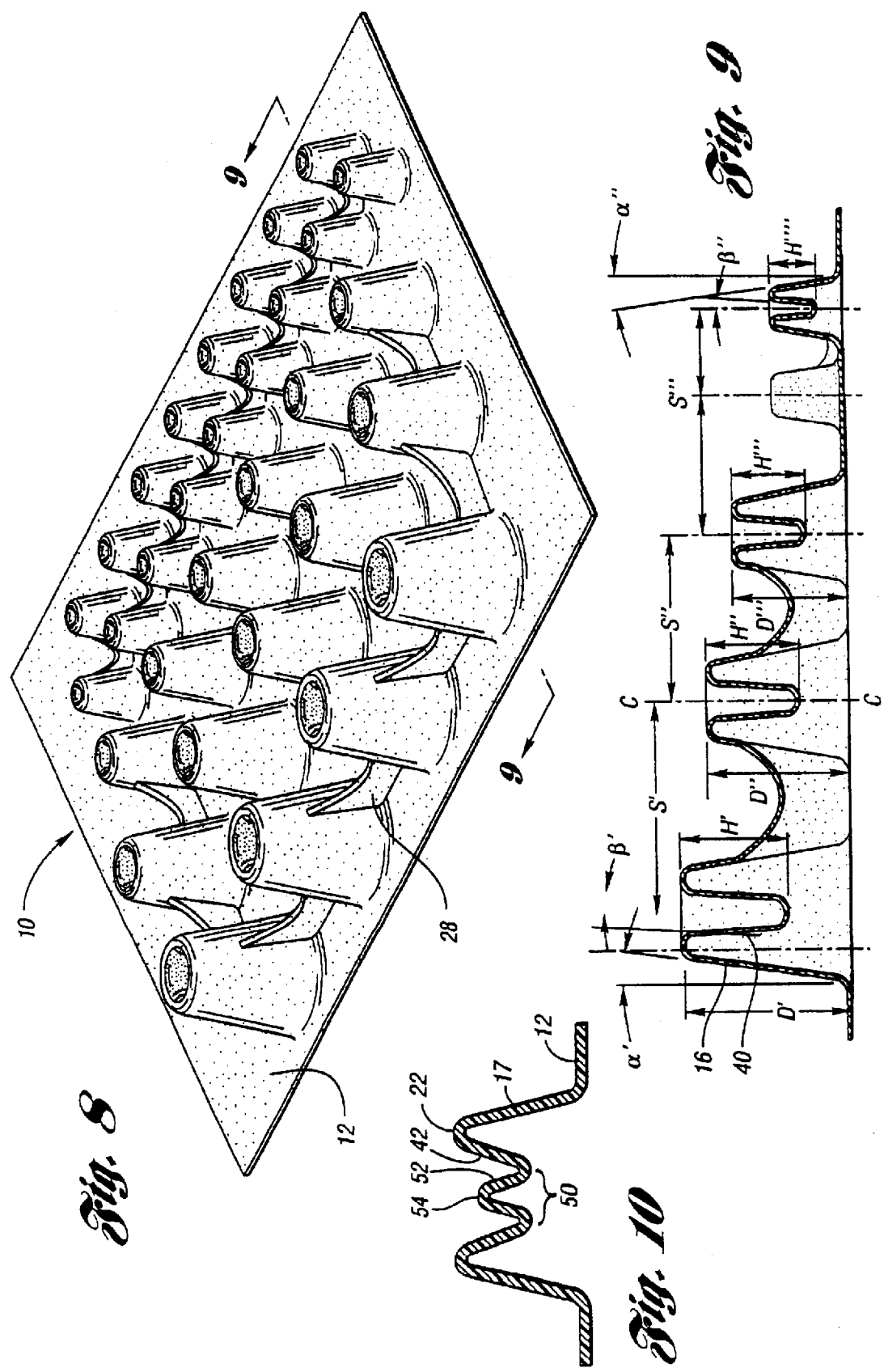

FORMED ENERGY ABSORBER

CROSS-REFERENCE TO RELATED APPLICATIONS

This application is a continuation-in-part of U.S. application Ser. No. 09/884,813 filed Jun. 19, 2001, which is a continuation-in-part of U.S. application Ser. No. 09/499,205 (now issued as U.S. Pat. No. 6,247,745) filed Feb. 7, 2000, which is a continuation of U.S. application Ser. No. 09/328,196 (now U.S. Pat. No. 6,199,942) filed Jun. 8, 1999, which is a continuation of U.S. application Ser. No. 09/018,666 filed Feb. 4, 1998 (now U.S. Pat. No. 6,017,084), the disclosures of which applications being incorporated by reference herein.

BACKGROUND OF THE INVENTION

1. Field of the Invention

This invention relates to an energy absorber for decelerating an object that impacts the absorber.

2. Background Art

The prior art discloses numerous devices that absorb mechanical energy in various applications. Examples include protective packaging used in shipping containers, crash helmets, bumpers and vehicular interior components. Ideally, the most efficient energy absorber exerts a constant resistive force to decelerate an impacting object over the distance that the impacting object displaces the incident surface of the absorber. The most efficient curve would have a constant slope of zero. As an example, elastomeric solids many times act as springs, where the force-deflection curve is essentially a straight line of a given slope. Many foam materials display a similar force-deflection curve, although the curves are usually of not of constant slope.

U.S. Pat. No. 3,933,387, entitled "Thermoformed Plastic Energy Absorber For Vehicles" concerns energy absorbing media that disclose identical truncated pyramids that extend from layered sheets of plastic stock which intermesh and mutually support each other. (Id., Col. 1, ll. 7–9; Col. 3, ll. 20–22.) The reference teaches that multiple sets of sheets may be stacked adjacent to each other in order to create an absorber within which the energy is absorbed. The pyramids of each sheet project onto the design quadrilateral of the opposing sheet and the edges of each pyramid contact the corresponding edges of the surrounding four pyramids. (Id., Col. 3, ll. 32–36.)

Commonly owned U.S. Pat. No. 5,700,545, entitled Energy Absorbing Structure, discloses an energy absorbing device that offers a nearly constant resistance force over a deflection distance, which if exactly constant, would be theoretically most efficient in absorbing energy. The disclosure of this patent is incorporated herein by reference. Energy is absorbed by a lattice of interconnected strands of material with apertures between the strands, such that upon deformation the strands at least partially coalesce and the apertures at least partially close.

Commonly owned U.S. Pat. No. 6,017,084 discloses stranded structures that are oriented such that nearly all the metal structure is substantially in the crush plane. The strips of stranded metal are connected by the incident member. This reduces cost and weight of the assembly.

Commonly owned U.S. Pat. No. 6,199,942 describes a structure wherein the stranded metals are assembled into channels in a base and/or a structure of recesses formed in the base. Either or both structures may provide impact protection.

These and other energy absorbing members, especially but not exclusively, in the automobile environment, are used to protect vehicle occupants and may be used in applications to meet the standard for head injury protection for automotive interiors (Federal Motor Vehicles Safety Standard 201), which is incorporated herein by reference. The standard requires that interior components must be tested using a 10 lbm headform impacting the surface at 15 mph. A measurement of HIC(d) (head injury criteria (dummy)) is determined according to a formula set forth in FMVSS 201. The value of HIC(d) should not exceed 1000.

The prior art leaves unsolved production and performance problems that stem from relatively expensive and in some cases, less effectual approaches. Injection molding, reaction molding, extruding, blow molding, honeycomb formation, and stranded metal manufacture can be relatively costly. Additionally, it can be difficult to mold very thin wall thickness with some molding technologies.

In light of these and related approaches, there remains the desire to absorb as much impact energy in as little crush distance as possible, with as little weight as is necessary, yet be capable of being manufactured under favorable economic conditions.

SUMMARY OF THE INVENTION

It is an object of the present invention to provide a more cost effective, efficient energy absorber.

The present invention is an energy absorber comprising a base and a plurality of recesses extending from the base. At least some of the plurality of recesses have a rim, a first wall extending between the base and the rim, a first floor, and a second wall extending between the rim and the first floor. At least some of the plurality of recesses are oriented such that their first and second walls are inclined respectively at angles alpha and beta to a major incident component of the impacting force, where alpha and beta lie between 1 and 45 degrees.

At least some of the recesses may be shaped as a cup, a cone, a frusto-conical body, a tetrahedron, a prism, a parallelepiped, a section of an ellipsoid, a section of an hyperboloid, and mixtures of such shapes. Further, some of the second walls and floors may be shaped as a cup, a cone, a frusto-conical body, a tetrahedron, a prism, a parallelepiped, a section of an ellipsoid, a section of an hyperboloid, and mixtures of such shapes.

These and other advantages of the present invention will become apparent to one of ordinary skill in the art in light of the following description and attached drawings.

BRIEF DESCRIPTION OF THE DRAWINGS

FIG. 6 is a quartering perspective view of a second alternate embodiment of the disclosed invention;

FIG. 7 is a cross-sectional view taken along the line 7—7 of the embodiment of FIG. 6;

FIG. 8 is a quartering perspective view of a third alternate embodiment of the disclosed invention;

FIG. 9 is a cross-sectional view taken along the 9—9 of the embodiment depicted in FIG. 8; and FIG. 10 is a perspective view of a different embodiment of the first recess.

DETAILED DESCRIPTION OF THE PREFERRED EMBODIMENTS

Figure 1:
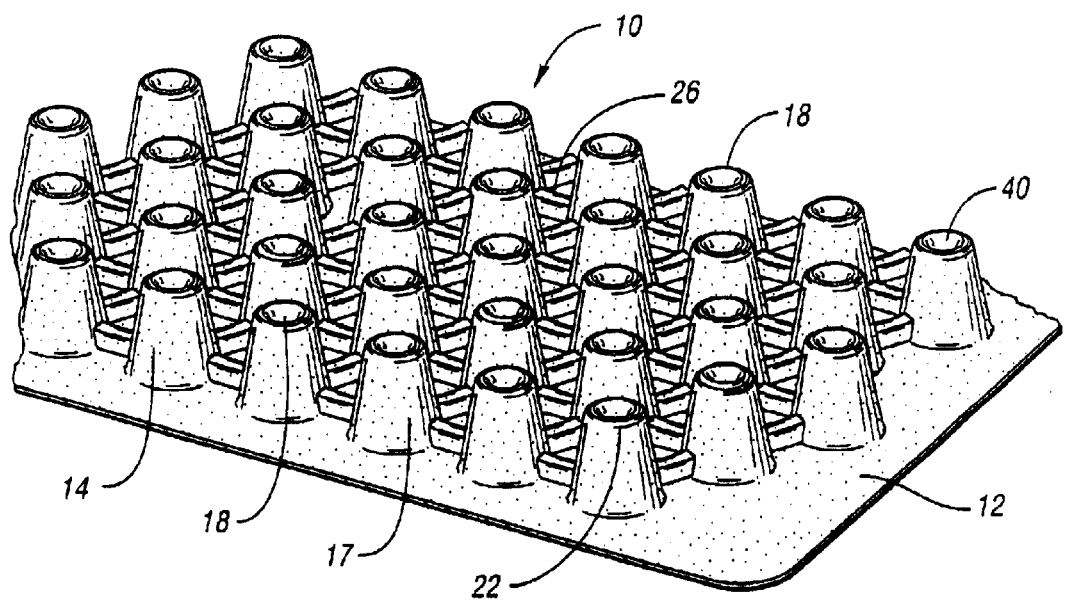
FIG. 1 is a quartering perspective view of an energy absorbing assembly manufactured in accordance with the present invention.
Figure 2:
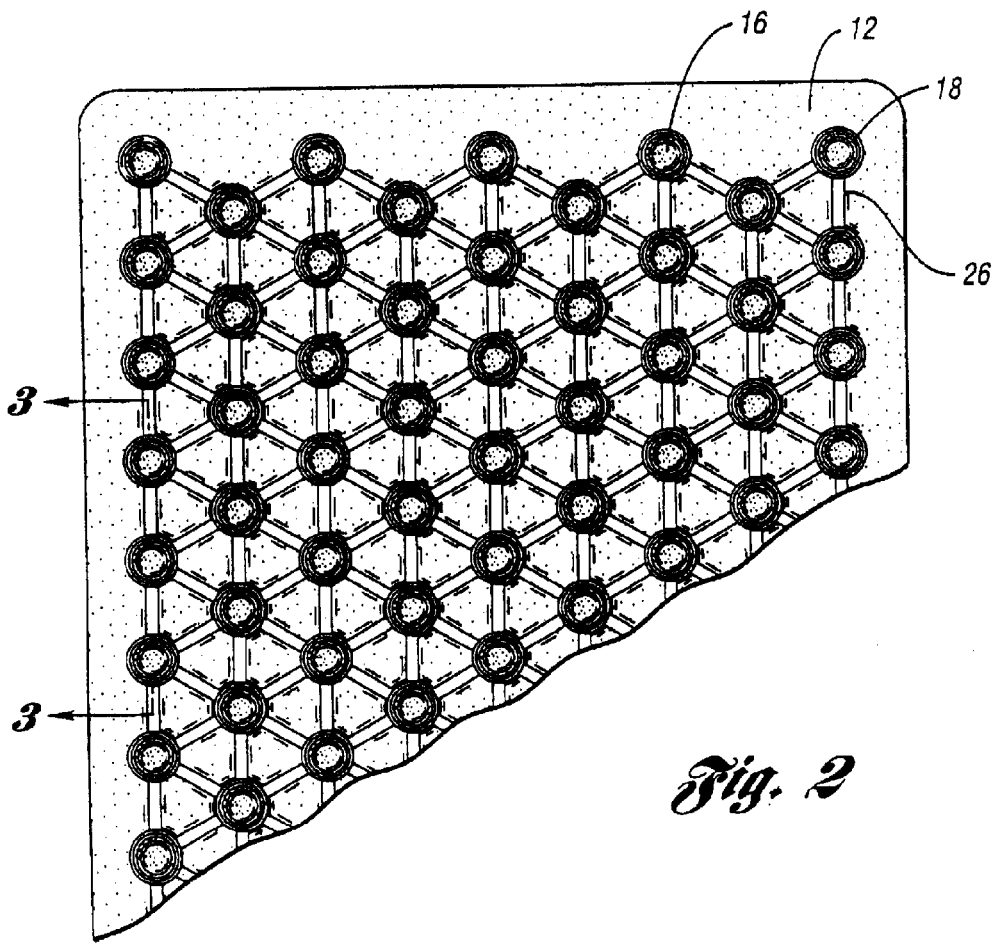
FIG. 2 is a bottom plan view of a portion thereof.
Figure 3:
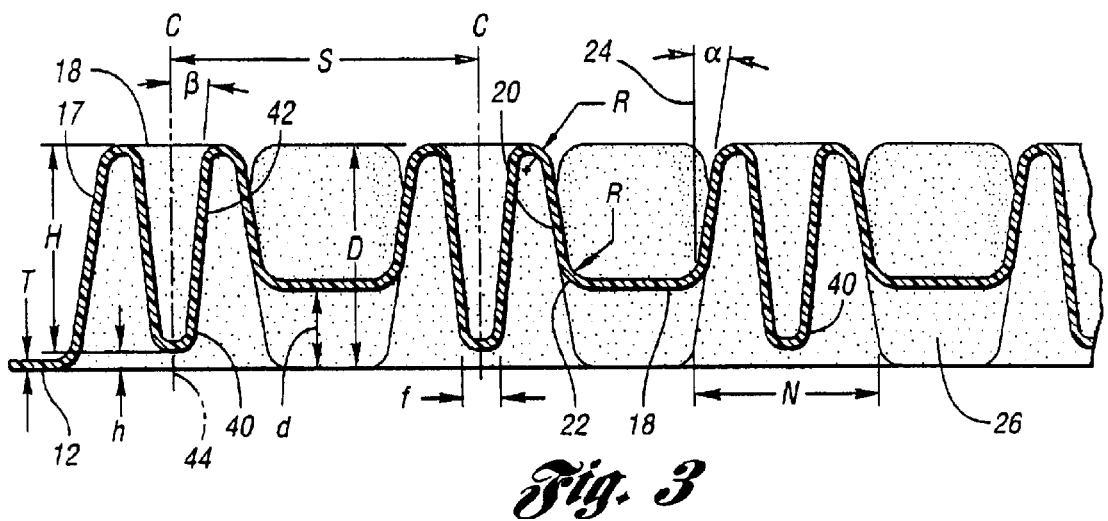
FIG. 3 is a cross-sectional view of the invention depicted in FIG. 2, taken along the 3—3 thereof.

Referring first to FIGS. 1–3 of the drawings, there is depicted an energy absorber 10 which has a base or basal connecting member 12 and a plurality of first recesses 16 defined extending from and integral with the base. At least some of the recesses have a rim 22, and at least one first wall 17 extending from the rim to the base 12. The rim 22 may have an average radius (R), or may be non-circular (termed herein as "curvilinear"). Preferably, the rim 22 has a flat portion 18, although the rim does not have to be substantially flat. A second inverted recess 40 extends into at least some of the first recesses 16. The second recess 40 has a second wall 42 and a floor 44. The floor 44 may be dome-shaped as shown in FIG. 3, or it may be substantially flat. Further, the floor may merely be a rim similar to the rim 22. It will be apparent that in many applications, the energy absorber 10 may perform satisfactorily in an inverted position.

At least some of the first recesses are oriented such that their floors 44 are substantially orthogonal to a major incident component 24 (FIG. 3) of the impacting force. The floor 44 of the second recesses may also be oriented such that the floors 44 are substantially orthogonal to a major incident component 24 (FIG. 3) of the impacting force. In a given first recess 16, the first wall 17 is inclined at an angle alpha ($\alpha$) to the major incident component 24 of the impacting force. The angle alpha ($\alpha$) is selected so that it lies between one and 45 degrees in order to maximize energy absorption by the first wall 17 over a given distance. In a given second recess 40, the second wall 42 is inclined at an angle beta ($\beta$) to the major incident component 24 of the impacting force. This angle beta ($\beta$) is also selected so that it lies between one and 45 degrees in order to maximize energy absorption. The angles alpha ($\alpha$) and beta ($\beta$) may be the same, or different from one another. Preferably, alpha ($\alpha$) and beta ($\beta$) are between 5 and 20 degrees. The first and second walls 17 and 42 may at least partially collapse during energy absorption, and at least some of the first and second recesses 16 and 40 become at least partially compressed or shatter, in some cases. In a coordinated manner arising from mutual support afforded by adjacent recesses 16 and 40, the energy absorber 10 serves to decelerate an object that impacts with an incident force thereupon. As the first and second walls 17 and 42 collapse, some of the deformation occurs elastically, thereby providing at least a partial "spring-back" following initial deformation.

A goal of this invention is to increases the critical load that recesses can withstand for a given D and a given H. Based on a simplified Euler's formula for column buckling, the critical load ($F_{cr}$) for a column before buckling occurs is $$F_{cr} = EI\pi^2/L^2$$

where E is the Young's modulus of the material, I is the moment of inertia of the cross section, and L is the length of the column. By adding a second wall 42 to the first recess 16, the moment of inertia of the cross section of the recess increases, thereby increasing the critical load.

The first and second recesses 16 and 40 may be shaped as truncated cones, sections of ellipsoids, sections of hyperboloids, or similar constructions, and may be of mixed shapes within a given energy absorbing module. Alternatively, at least some of the first and second recesses 16 and 40 are shaped as a cup, a cone, and frusto-conical body, a tetrahedron, a prism, and a parallelepiped.

Thus, the invention embraces a sheet of material with first and second recesses 16 and 40 formed in it. The sheet remains continuous after the first and second recesses 16 and 40 are made. Preferably, the first and second recesses 16 and 40 are integral with, or are monolithic with the base 12 and sheet from which they are formed. When thermoforming is the manufacturing method of choice, it will be appreciated that wall thickness may vary between points on the base 12, the walls 17 and 42, and the floor 44.

Continuing with particular reference to FIG. 3, the first and second recesses 16 and 40 have imaginary central lines (C) which are spaced apart by a distance (S). The average depth of the first recesses 16 depicted in the embodiment of FIG. 3 is represented by the letter (D). The reference letter (d) represents the average depth of a channel 26 which, when present, communicates with adjacent first recesses. The first recesses 16 are further characterized by the reference letter (W) which represents the diameter of the first recess 16 measured at the base, or basal plane 12. As illustrated, the base 12 has a thickness represented by the reference letter (T). Another design variable is the radius (r) (FIG. 3) which characterizes the joinder of a first wall 17 with a channel 26.

The second recesses 40 have a height or depth from the rim 22 to the floor 44 depicted in the drawings as H. The distance from the floor 44 to the base 12 is depicted as h. Preferably, h is approximately zero and H is approximately equal to D. In some cases, H may be reduced to provide optimal energy management. The floor 44 has a width f.

It will be noted from the views of FIGS. 1 and 3 that the first walls 17 are connected by the rim 22 of a given first recess, while first walls of adjacent first recess are connected by the base 12 or channel 26. The second walls 42 of the second recesses 40 are connected by the floor 44.

In the preferred embodiment, at least one first wall 17 is generally shaped as a frusto-conical surface and the rim 22 has an average radius (R) of about 0.5–2.0 mm.

Impact tests have shown good results where the ratio of (D) to (W) is between about 2.0 and 0.3, while the ratio of (W) to (S) is between about 0.2 and 0.7. Good results have also been obtained when the first recesses 16 are further characterized by depth (D) to side thickness (T) ratio between about 4 and 20. Depending on the energy absorption requirements of the specific application, the depth of the channel (d), when present, may be up to the depth (D) of the first recess 16.

In various applications, experimentation has revealed that for a given geometry of first and second recesses 16 and 40, the inter-recess spacing (S) may affect the particular deformation characteristics. Preferably, the recesses 16 and 40 are arranged in a plurality of rows. In an even more preferred design, the recesses 16 and 40 are arranged in a plurality of staggered rows such that the distance between a first recess 16 and all adjacent first recesses is equal, as shown in FIG. 2.

Figure 4:
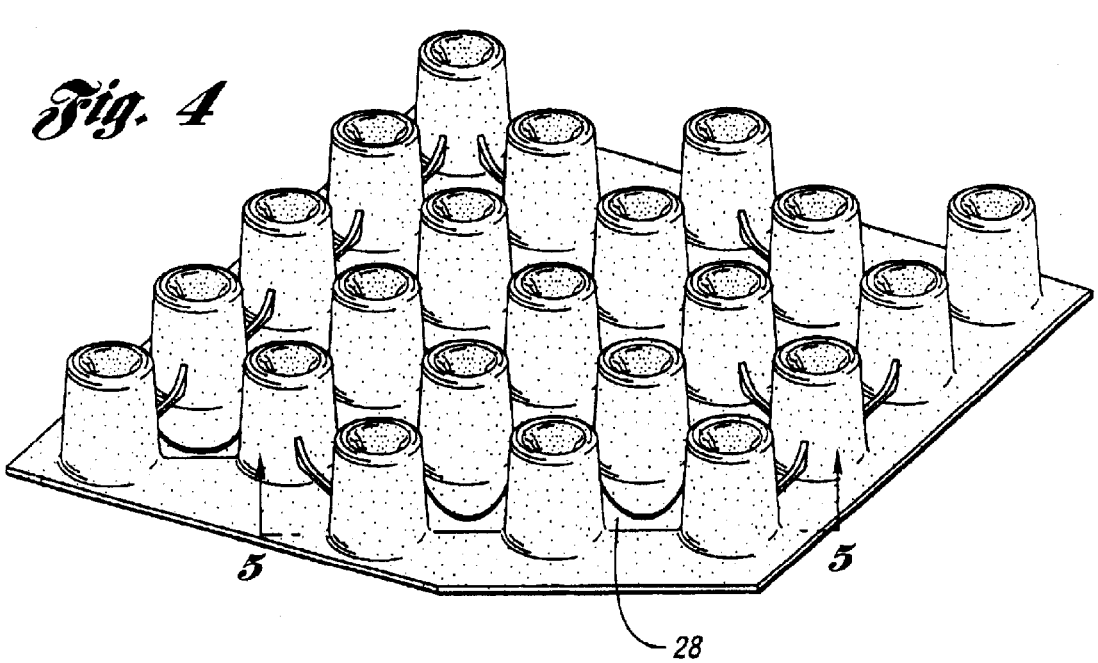
FIG. 4 is a quartering perspective view of an alternate embodiment of the disclosed invention.
Figure 5:
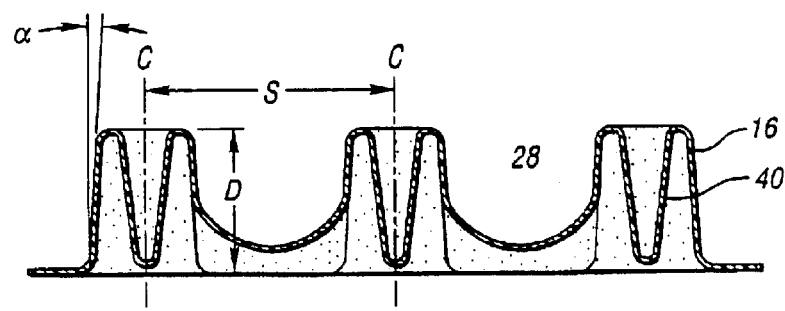
FIG. 5 is a cross-sectional view of the embodiment depicted in FIG. 4 taken along the line 5—5 thereof.

Turning now to FIGS. 4–5, there is depicted an alternate embodiment of the energy absorber of the invention wherein structural reinforcing ribs 28, rather than channels, connect at least some of the first recesses 16.

In the preferred embodiment, the first recesses 16 may be joined by channels 26 of various depths (d) (FIG. 3) and shapes. Generally, the channels 26 are formed such that their depth (d) is less than the depth (D) of the first recess 16 below the base 12.

Turning now to FIGS. 6–7, there is depicted a second alternate embodiment of the energy absorber of the present invention. In this embodiment, the energy absorber comprises two or more modules 30,32 which are inclined with respect to each other by an angle theta (θ). In the module 32, the first recesses 16' are characterized by an imaginary line C'—C' which extends orthogonally to the base 12 such that the axes C'—C' and C—C (associated with the modules 30, 32) are parallel. Upon inspection of FIGS. 6–7, it will be appreciated that the angle theta (θ) essentially defines the inclination of intersection planes. In practice, however, the bases of intersecting modules 30, 32 may not intersect discretely along a bend or joinder line, but instead be joined by a curvilinear intersecting segment (not shown). It may also be appreciated that the module 32 may be formed by folding a portion of the base 12 of module 30, such that the axes C'—C' may be inclined to the axes C—C.

Continuing with reference to FIG. 7, in the first module (left hand side), an angle alpha (α) denotes the angle of inclination of the wall 17 with respect to the center line C of a representative recess. In the second module, the angle gamma (γ) represents the inclination of wall 17' with respect to a major incident component of the impacting force 24'.

The base 12 may have a continuous contour change, as opposed to the depiction in FIG. 7 in which a first base portion is shown inclined to a second base portion by the angle theta (θ).

In light of this disclosure, it will be apparent that the energy absorbing characteristics of the energy absorber can be tailored to suit the needs of the particular application by suitable combination of depths (D) and (H) of the first and second recesses 16 and 40, respectively, depth (d) of the channels, inter-recess spacing (S), wall inclination (α, β, γ), inter-module inclination (θ), and shape of the first and second recesses.

Turning now to FIGS. 8–9, there is depicted another alternate embodiment of the present invention wherein the energy absorber 10 includes first and second recesses 16 and 40 that are placed at intervals which include irregular center-to-center distances across the base 12. In FIG. 9, the depths of the first recesses 16 and second recesses 40 are depicted by the reference letters D', D'', D''', etc. and H', H'', H''', etc. The inter-first recess space is represented by the reference letters S', S'', S''', etc. Customized angles of inclination of the first and second recesses 16 and 40 are illustrated by the symbols α' and α'' and β' and β'', respectively.

Still further alternative embodiments comprehend the formation of one or more troughs or catches (not shown) that are generally defined within the bases 12 so that wires, tubes, and the like can be accommodated therein and so that one or more fluid conduits can be provided by the assembly.

An alternate embodiment of the first and second recesses 16 and 40 is shown in FIG. 10. A plurality of notches 19 are formed in the rim 22, the first wall 17, and the second wall 42 the stiffness and crush characteristics of the recesses. The number of notches 19 can vary.

Yet another embodiment of the recess is shown in FIG. 10. In profile, this embodiment is depicted as a crater or volcano. A third recess 50 having third walls 52 and a second floor 54 or apogee extends into at least some of the second recesses 40. In this embodiment, the floor or perigee 44 becomes a rim similar to rim 22. The third recess 50 is inverted relative to the second recess 40. The characteristics of the third recess 50, the third wall 52, and the second floor 54 are similar to the characteristics of the other recesses, walls, and floors. In yet other embodiments, additional recesses can be formed inside the recess. Any of the embodiments of the recesses 16, 40, and 50 described above can work with the following refinements of the invention.

Reference was also made above to the formation of one or more bending lines between adjacent energy absorbers in order to conform to abrupt contour changes of a substrate or structure to which the energy absorber is attached. The purpose of such axes is to orient an imaginary central line of the energy absorbing module substantially normally to a reaction surface. Depending upon the impact environment, these axes may either extend along the base (basal plane) or along an imaginary line connecting recesses and/or ribs.

One preferred technique for manufacturing the disclosed embodiments of the present invention is to use a thermoforming process, which begins with a thermoplastic sheet. Many types of thermoplastic resins may be used in a variety of sizes and thicknesses. Suitable materials for use in the disclosed thermoplastic process include: acrylonitrile-butadiene-styrene (ABS) resin, acetate, polycarbonate, polystyrene, polyethylene (low or high density), polypropylene, polyester, and polyvinyl chloride (PVC). Blends and copolymers of these and other resins may also be used. Other suitable materials include any thermoplastic with an acceptable freezing range and softening character.

Sheet thickness (T) affects not only the thermoforming process steps and the characteristics of the modular energy absorbing assembly made thereby, but also significantly affects manufacturing economics. In general, less material is required to produce an assembly of the type disclosed herein when using lighter weight, thinner-gauge plastics. Conversely, the use of heavier-gauge materials requires more material, which tends to increase costs. Other things being equal, by a suitable selection of the design factors discussed herein, manufacturing economies can be realized while producing an energy absorbing assembly which is tailored to suit the needs of the particular operational environment.

Thermoforming allows the formation of first and second recesses with relatively thin wall thicknesses. To achieve a thin wall section by other means, such as injection molding may, require the use of polymers having relatively high melt flows, hot molds, prolonged freezing times, and other accommodations, which tend to increase manufacturing costs.

A useful summary of conventional thermoforming arts is found in J. Florian, PRACTICAL THERMO FORMING, 2d Ed. (1996), Chs. 2–5 of which being incorporated herein by reference.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An energy absorber comprising:
    a base; and
    a plurality of recesses extending from the base, at least some of the plurality of recesses becoming at least partially compressed during energy absorption and having
        a rim;
        a first wall extending between the base and the rim;
        a first floor; and a second wall extending between the rim and the first floor so that as the first and second walls collapse during energy absorption, some deformation occurs elastically, thereby providing some spring-back following initial deformation, wherein at least some of the plurality of recesses are oriented such that their first and second walls are inclined respectively at angles alpha and beta to a major incident component of the impacting force, where alpha and beta lie between 1 and 45 degrees, and wherein some of the recesses cooperate to afford mutual support in decelerating an object that imparts the impacting force.

2. The energy absorber of claim 1, wherein the first floor is coplanar with the base.

3. The energy absorber of claim 1 wherein at least some of the recesses are connected by ribs.

4. The energy absorber of claim 1 wherein at least some of the recesses are connected by channels.

5. The energy absorber of claim 1 wherein the ratio of the average depth of the recess to the diameter of the recess measured at the base is between 2.0 and 0.3.

6. The energy absorber of claim 1 wherein the ratio of the diameter of the recess measured at the base to the distance between imaginary centers of the recesses is between 0.2 and 0.7.

7. The energy absorber of claim 1, wherein the angle alpha is equal to the angle beta.

8. An energy absorber comprising:
a base; and
a plurality of recesses extending from the base, at least some of the plurality of recesses having
a rim;
a first wall extending between the base and the rim;
a first floor; and
a second wall extending between the rim and the first floor
wherein at least some of the plurality of recesses are oriented such that their first and second walls are inclined respectively at angles alpha and beta to a major incident component of the impacting force, and the angles alpha and beta are between five and fifteen degrees.

9. An energy absorber comprising:
a base; and
a plurality of recesses extending from the base, at least some of the plurality of recesses having
a rim;
a first wall extending between the base and the rim;
a first floor; and
a second wall extending between the rim and the first floor
wherein at least some of the plurality of recesses are oriented such that their first and second walls are inclined respectively at angles alpha and beta to a major incident component of the impacting force, and the angle alpha is greater than the angle beta.

10. An energy absorber comprising:
a base; and
a plurality of recesses extending from the base, at least some of the plurality of recesses having
a rim;
a first wall extending between the base and the rim;
a first floor; and
a second wall extending between the rim and the first floor wherein at least some of the plurality of recesses are oriented such that their first and second walls are inclined respectively at angles alpha and beta to a major incident component of the impacting force, and the angle beta is greater than the angle alpha.

11. The energy absorber of claim 1, wherein the rim is circular.

12. The energy absorber of claim 1, wherein the rim is oval.

13. The energy absorber of claim 1, wherein the rim has a flat surface.

14. The energy absorber of claim 1, wherein the first floor is a domed surface.

15. The energy absorber of claim 1, wherein the plurality of recesses are arranged in a plurality of rows.

16. The energy absorber of claim 15, wherein the recesses in the plurality of rows are staggered.

17. The energy absorber of claim 15, wherein each recess is characterized by an imaginary center, the centers of facing pairs of recesses from adjacent rows lying at corners of a parallelogram.

18. An energy absorber comprising:
a base; and
a plurality of recesses extending from the base, at least some of the plurality of recesses having
a circular rim;
a first wall extending between the base and the rim;
a first floor; and
a second wall extending between the rim and the first floor
wherein at least some of the plurality of recesses are oriented such that their first and second walls are inclined respectively at angles alpha and beta to a major incident component of the impacting force, where alpha and beta lie between 1 and 45 degrees; and
a second floor and a third wall extending between the first floor and the second floor.

19. The energy absorber of claim 1 wherein the base comprises a plurality of modules, each module having a plurality of recesses, at least one module being inclined at an angle relative to at least one other module.

20. The energy absorber of claim 1 wherein at least some of the recesses have different depths.

21. The energy module of claim 1 wherein at least some of the imaginary centers of the recesses are at irregular distances from other imaginary centers.

22. The energy absorber of claim 1, wherein at least some of the second walls and first floors are shaped as a cup, a cone, a frusto-conical body, a tetrahedron, a prism, a parallelepiped, a section of an ellipsoid, a section of an hyperboloid, and mixtures of such shapes.

23. The energy absorber of claim 1, wherein at least some of the recesses are shaped as a cup, a cone, a frusto-conical body, a tetrahedron, a prism, a parallelepiped, a section of an ellipsoid, a section of an hyperboloid, and mixtures of such shapes.

24. An energy absorber comprising:
a base;
a plurality of first recesses extending from the base, at least some of the plurality of recesses becoming at least partially compressed during energy absorption and having
a rim; and
a first wall extending between the base and the rim;
wherein at least one of the first recesses has an inverted second recess defined within the first recess, the second recess having a second floor; and a second wall extending between the rim and the second floor, so that as the first and second walls collapse, some deformation occurs elastically, thereby providing some spring-back following initial deformation, and wherein at least some of the plurality of first and second recesses are oriented such that their first and second walls are respectively inclined at angles alpha and beta to a major incident component of the impacting force, where alpha and beta lie between 1 and 45 degrees, wherein some of the recesses cooperate to afford mutual support in decelerating an object that imparts the impacting force.

25. An energy absorber shaped as a volcano, comprising:

a basal connecting member;

a first wall extending upwardly from the basal connecting member toward a rim, the first wall at least partially collapsing during energy absorption;

a crater extending downwardly from the rim, the crater becoming at least partially compressed during energy absorption and including one or more second walls extending between, a perigee and the rim, so that as the first and one or more second walls collapse, some deformation occurs elastically, thereby providing some spring-back following initial deformation, wherein the first wall and at least some of the one or more second walls are inclined respectively at angles alpha and beta to a major incident component of an impacting force, where alpha and beta lie between 1 and 45 degrees, wherein one or more of the craters cooperate to afford mutual support in decelerating an object that imparts the impacting force.

* * * * *